United States Patent
Zhang et al.

(10) Patent No.: US 12,555,568 B2
(45) Date of Patent: Feb. 17, 2026

(54) DEVICE CONTROL METHOD AND APPARATUS, READABLE STORAGE MEDIUM AND CHIP

(71) Applicant: Beijing Xiaomi Mobile Software Co., Ltd., Beijing (CN)

(72) Inventors: Xiuyun Zhang, Beijing (CN); Chunxing Cai, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 254 days.

(21) Appl. No.: 18/086,249

(22) Filed: Dec. 21, 2022

(65) Prior Publication Data
US 2024/0105164 A1 Mar. 28, 2024

(30) Foreign Application Priority Data
Sep. 28, 2022 (CN) .......................... 202211193908.X

(51) Int. Cl.
*G10L 15/02* (2006.01)
*G10L 15/08* (2006.01)
*G10L 15/30* (2013.01)
*G10L 15/22* (2006.01)

(52) U.S. Cl.
CPC ........ *G10L 15/08* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 10,971,173 B2* | 4/2021 | Kothari | G06N 20/00 |
| 11,393,478 B2* | 7/2022 | Bates | G10L 17/00 |
| 11,514,109 B2* | 11/2022 | Sharifi | G16Y 10/80 |
| 11,822,857 B2* | 11/2023 | Aiken | H04L 12/2829 |
| 11,942,085 B1* | 3/2024 | Mutagi | G10L 15/22 |
| 12,118,995 B1* | 10/2024 | Blanksteen | G06F 3/167 |

(Continued)

FOREIGN PATENT DOCUMENTS

| | | |
|---|---|---|
| CN | 104965448 A | 10/2015 |
| CN | 108668153 A | 10/2018 |

(Continued)

OTHER PUBLICATIONS

Chinese Office Action issued on Jul. 9, 2024 for Chinese Patent Application No. 202211193908.
(Continued)

*Primary Examiner* — Seong-Ah A Shin
(74) *Attorney, Agent, or Firm* — Volpe Koenig

(57) ABSTRACT

A device control method, includes: in response to determining a target voice module is awakened, a collected first voice information is sent to a first server, the first voice information is configured to convert the first voice information into a first control instruction by the first server and send the first control instruction to a second server, and the first voice information contains information for controlling a second target device; the first control instruction fed back by the second server is received; and the second target device is controlled by using the target voice module or a processor according to the first control instruction, and the target voice module and the processor are equipped in a first target device.

18 Claims, 5 Drawing Sheets

(56) References Cited

U.S. PATENT DOCUMENTS

| | | | |
|---|---|---|---|
| 2019/0295542 A1 | 9/2019 | Huang et al. | |
| 2020/0159491 A1* | 5/2020 | Mutagi | G10L 15/02 |
| 2020/0194004 A1* | 6/2020 | Bates | H04L 67/125 |
| 2021/0375281 A1 | 12/2021 | Gao | |
| 2022/0013121 A1* | 1/2022 | Ni | G10L 15/30 |
| 2022/0028379 A1* | 1/2022 | Carbune | G06F 16/3344 |
| 2022/0139573 A1* | 5/2022 | Sharifi | G16Y 40/35 |
| | | | 709/223 |
| 2023/0362026 A1* | 11/2023 | Bajaj | H04L 12/282 |

FOREIGN PATENT DOCUMENTS

| | | |
|---|---|---|
| CN | 110070863 A | 7/2019 |
| CN | 111261151 A | 6/2020 |
| CN | 111722824 A | 9/2020 |
| CN | 111724784 A | 9/2020 |
| CN | 112151013 A | 12/2020 |
| CN | 113470634 A | 10/2021 |
| CN | 114023303 A | 2/2022 |
| CN | 115083401 A | 9/2022 |
| KR | 1020190050761 A | 5/2019 |

OTHER PUBLICATIONS

Extended European Search Report issued on Aug. 16, 2023 for European Patent Application No. 22217062.3.

* cited by examiner

DEVICE CONTROL METHOD AND APPARATUS, READABLE STORAGE MEDIUM AND CHIP

CROSS REFERENCE TO RELATED APPLICATIONS

The present application claims priority to Chinese Patent Application No. 202211193908.X, filed on Sep. 28, 2022. The entire contents of the above-listed application are hereby incorporated by reference for all purposes.

BACKGROUND

Along with the increasing improvement of the living standard of people, smart home plays an important role in daily life of people, and brings great convenience to the life of people.

SUMMARY

The present disclosure relates to the field of smart home, and in particular to a device control method and apparatus, a readable storage medium, and a chip.

In order to overcome the problems in the related art, the present disclosure provides a device control method and apparatus, a readable storage medium, and a chip.

According to a first aspect of the embodiments of the present disclosure, a device control method is provided, which is applied to a target voice module, the method including:

in response to determining the target voice module is awakened, sending a collected first voice information to a first server, the first voice information is configured to convert the first voice information into a first control instruction by the first server and send the first control instruction to a second server, and the first voice information contains information for controlling a second target device;

receiving the first control instruction fed back by the second server; and controlling the second target device by using the target voice module or a processor according to the first control instruction, and the target voice module and the processor are equipped in a first target device.

According to a second aspect of the embodiments of the present disclosure, a computer-readable storage medium is provided, having stored thereon computer program instructions, and the steps of the device control method provided by the first aspect of the present disclosure are implemented when the program instructions are executed by a processor.

According to a third aspect of the embodiments of the present disclosure, a chip is provided, which includes a processor and an interface; and the processor is configured to read instructions to execute the steps of the device control method provided by the first aspect of the present disclosure.

The technical solutions provided by the embodiments of the present disclosure may include the following beneficial effects.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate the embodiments consistent with the present disclosure and, together with the specification, serve to explain the principles of the disclosure.

DETAILED DESCRIPTION

Exemplary embodiments will be described in detail here, and examples thereof are shown in the accompanying drawings. When the following descriptions refer to the figures, the same numbers in different figures indicate the same or similar elements, unless otherwise indicated. The implementation manners described in the following exemplary examples do not represent all implementation manners consistent with the disclosure. Instead, they are merely examples of apparatuses and methods consistent with some aspects of the present disclosure described as detailed in the appended claims.

It should be noted that all actions for acquiring signals, information or data in the application are carried out on the premise of complying with the corresponding data protection regulations and policies of the country where the application is located, and with the authorization of the corresponding apparatus owner.

Along with the increasing improvement of the living standard of people, smart home plays an important role in daily life of people, and brings great convenience to the life of people.

In the related art, a user can control the smart home devices on a terminal such as a mobile phone, however, when the user does not carry the terminal and wants to control the smart home devices, the user is required to actively walk to the location of the smart home to control the smart home devices, or walk to the location of the terminal to control the smart home devices by using the terminal, which brings inconvenience to the life of the user.

Figure 1:
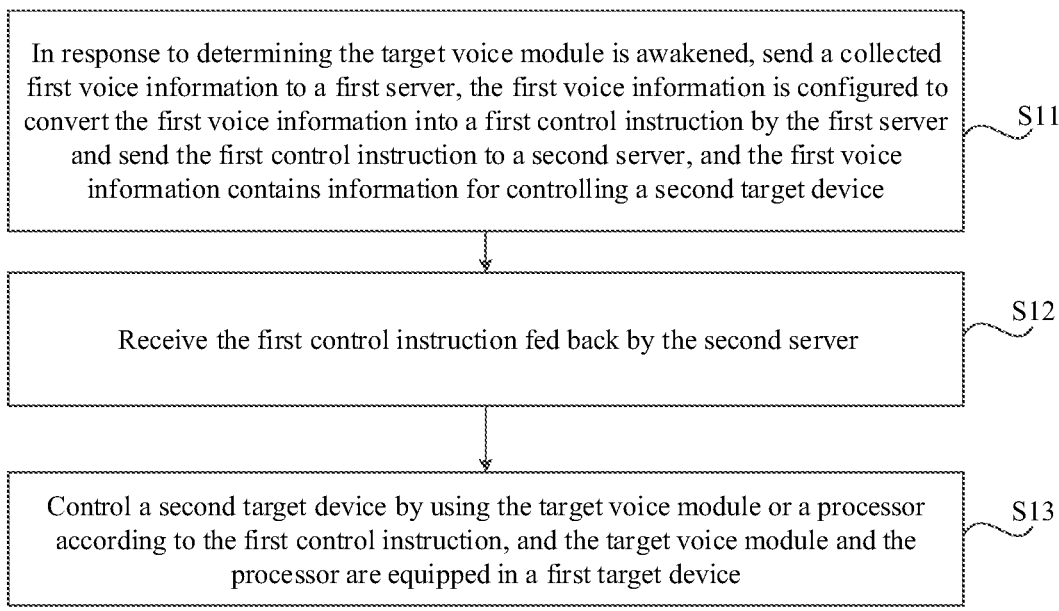
FIG. 1 is a flowchart of a device control method according to an example.

FIG. 1 is a flowchart of a device control method according to an example. As shown in FIG. 1, the device control method may be applied to a target voice module, and includes the following steps.

In S11, in response to determining the target voice module is awakened, a collected first voice information is sent to a first server, the first voice information is configured to convert the first voice information into a first control instruction by the first server and send the first control instruction to a second server, and the first voice information contains information for controlling a second target device.

In the present disclosure, the target voice module, in addition to Internet of Things (JOT) capability, further possesses audio processing capability, that the target voice module possesses IOT capability can be understood as the target voice module can establish connection with a smart home control platform, for example, the target voice module can establish connection with servers such as an IOT server to perform control over a smart device, the target voice module and a processor can be equipped in a first target device, the target voice module is connected the processor through a serial port, and the second target device may also be equipped with a voice module and a processor.

The first target device is an awakened device capable of controlling the second target device, and the second target device is a controlled device; the first server may be a server capable of processing a voice information, for example, a Xiao ai server; the second server may be a server that issues control instructions in the whole device control method, most of the instructions need to be issued to the target voice module in the first target device by the second server, the target voice module determines whether itself can process the instructions, and the second server may be an IOT server; and the first control instruction corresponds to the first voice information and can be used to control functions on the second target device.

In the present disclosure, the target voice module may be awakened by the following sub-steps.

In sub-step A1, a second voice information sent by a third target device is received by a third server; in sub-step A2, the target voice module is awakened from a plurality of voice modules according to the priorities of the plurality of voice modules and the distances between the plurality of voice modules and a sound source outputting the second voice information through the third server.

Figure 2A:
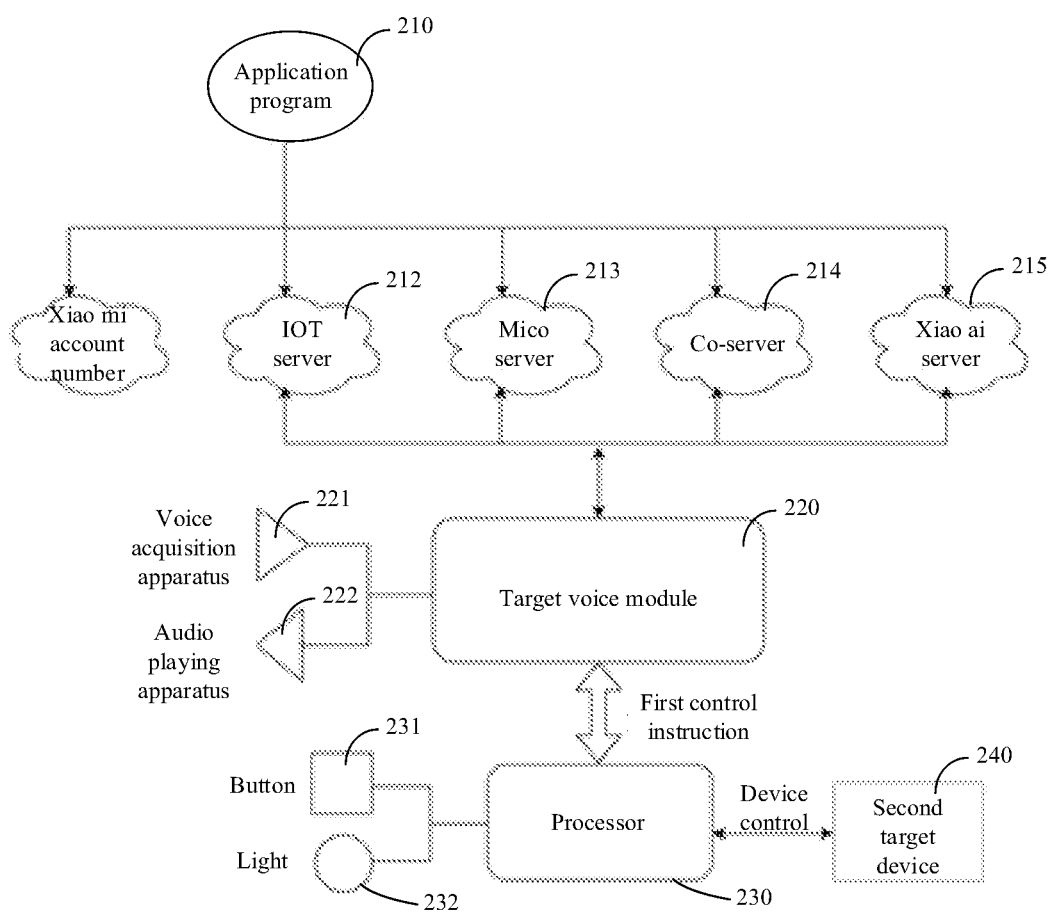
FIG. 2A is a block diagram illustrating interaction of a plurality of servers with a target voice module according to an example.

The third server may be a server that awakes the target voice module in the first target device from a plurality of servers, for example, a co-server (collaboration server) shown in FIG. 2A, the third target device may be a device closer to the sound source outputting the second voice information, and the third target device, the second target device, and the first target device may be the same smart home device or different smart home devices.

Specifically, in the space where the sound source is located, a voice module in the third target device closer to the sound source receives the second voice information and transmits the second voice information to the third server, and the third server receives the second voice information transmitted by the voice module in the third target device; and the third server awakens the target voice module in the first target device from the plurality of voice modules according to the priorities of the voice modules of the plurality of devices in the space where the sound source is located and the distances between the plurality of voice modules and the sound source.

For example, three smart home devices including a washing machine, a television, and a microwave oven are available in a house, the first target device is the washing machine, the second target device is the television, the third target device is the microwave oven, the first server is a Xiao ai server, the second server is an IOTserver, and the third server is a co-server.

As shown in FIG. 2A, a user utters a second voice information 'Is Xiao ai here', in such a case, the voice module of the microwave oven which is the closest voice module to the user in the house receives the second voice information and transmits the second voice information to the co-server 214; the co-server awakens the target voice module 220 of the washing machine from the voice modules of the three smart home devices in the house according to the priorities of the voice modules of the three smart home devices in the house and the distances between the voice modules of the three smart home devices and the user, so that the target voice module of the washing machine is in an awakened state.

As shown in FIG. 2A, the target voice module 220 may be equipped with a sound capturing apparatus 221 and an audio playing apparatus 222, the sound acquisition apparatus may be a microphone, the audio playing apparatus may be a player, in response to determining the target voice module is awakened, the target voice module may acquire the first voice information output by the user through the sound acquisition apparatus and then play information related to voice through the audio playing apparatus or output voice feeding back the first voice information output by the user through the audio playing device.

The voice module in the smart home device, such as the second target device and the third target device, may also be equipped with a sound acquisition apparatus and an audio playing apparatus to perform the functions of acquisition voice and playing audio which are the same as that of the first target device, and the present disclosure is not limited herein.

For example, when the voice module of the third target device receives the second voice information 'Is Xiao ai here', the voice module of the third target device may awaken the target voice module of the first target device through the co-server, and the target voice module may output a voice of 'I am here' through the audio playing apparatus, thereby providing feedback on the voice information output by the user.

The third server may awaken the target voice module from the plurality of voice modules according to the priorities of the plurality of voice modules and the distances between the plurality of voice modules and the sound source outputting the second voice information.

Specifically, when the number of the voice modules in the space where the sound source is located is 1, the third server awakens the unique voice module as the target voice module; when the number of the voice modules in the space where the sound source is located is greater than 1, the third server may first use the voice module with the highest priority as the target voice module from the plurality of voice modules; in a case that a plurality of voice modules with the highest priority are available, the voice module closest to the sound source outputting the second voice information among the plurality of voice modules with the highest priority is used as the target voice module.

It can be understood that the higher the priority, the higher the capability of the voice module to process audio data, for example, the audio processing capability of the voice module in the device such as a Xiao ai loudspeaker and a player is higher than that of device such as a washing machine and a microwave oven, so that the priority of the voice module with higher audio processing capability is higher than that of the voice module with weaker audio processing capability.

For example, when the third server awakens the target voice module from a plurality of voice modules, the voice module of the device such as the Xiao ai loudspeaker can be preferentially awakened, and when no Xiao ai loudspeaker is available, the priorities of the voice modules of the devices such as the washing machine and the microwave oven are the same, so that the voice module of the washing machine closest to the user can be awakened as the target voice module from the plurality of voice modules with the same priority.

In S12, the first control instruction fed back by the second server is received.

In the present disclosure, as shown in FIG. 2A, the first target device includes a target voice module 220 and a processor 230, and the target voice module is connected to the processor through a serial port, which can also be understood as being connected through a serial communication interface. The voice module is related to audio, so the target voice module is equipped with a voice acquisition apparatus 221 and an audio playing apparatus 222; the processor is related to the functions of the device, and is equipped with function buttons and lights, for example, the processor of the washing machine is equipped with function buttons 231 for turning on the washing machine, timing the washing machine and the like, and is also equipped with control over the lights 232 on a display panel of the washing machine.

Of course, the second target device 240 and the third target device may also be the same as the first target device, and include a voice module and a processor and is configured to receive the first control instruction fed back by the second server.

The voice module can be a Xiao ai voice module and is a chip formed by a plurality of circuits; and the processor is a Microcontroller Unit (MCU) processor.

The first control instruction received by the target voice module may be a request value, and different control instructions correspond to different request values, for example, the request value requesting to turn on the washing machine is 1, the request value requesting to turn on the television is 2, and the like.

In S13, the second target device is controlled by using the target voice module or a processor according to the first control instruction, and the target voice module and the processor are equipped in the first target device.

In the present disclosure, the second target device controlled by the first target device may be the first target device, or also may be other smart home devices.

In response to determining the first voice information received by the target voice module is a first preset voice information, the target voice module determines that it cannot control the second target device according to the first control instruction sent by the second server; in response to determining the first voice information received by the target voice module is a second preset voice information, the target voice module determines that it can control the second target device according to the first control instruction sent by the second server; and when the first voice information received by the target voice module is a third preset voice information, the target voice module determines that it can interact with the user uttering the sound source according to the second control instruction sent by the first server.

Specifically, the first preset voice information is a voice irrelevant to audio playing, such as turning on a television, adjusting brightness of the television, turning on a microwave oven, adjusting heating time of the microwave oven, and the like. In response to determining the first voice information is the first preset voice information, it is indicated that the user wants to control the second target device, rather than playing audio, in such a case, the target voice module, after receiving the first control instruction output by the second server, determines that the target voice module is unable to process the first control instruction, and thus forwards the first control instruction to the processor to instruct the processor to control the second target device according to the first control instruction.

For example, after the target voice module of the washing machine is awakened by the co-server, when the user again utters the first voice information 'Turn on TV', the awakened target voice module sends the first voice information to the Xiao ai server; and after parsing the first voice information, the Xiao ai server 215 converts the first voice information into a first control instruction, and forwards the first control instruction to the IOT server 212, which forwards the first control instruction to the target voice module 220 via an OT channel, the target voice module forwards the first control instruction to the processor in the washing machine, and the processor in the washing machine controls the television to be turned on according to the first control instruction.

Specifically, the second preset voice information is a voice related to audio playing, such as playing music, pausing playing music, and the like. In response to determining the first voice information is the second preset voice information, it is indicated that the user wants to control an audio function of the second target device, in such a case, the target voice module, after receiving the first control instruction output by the second server, determines that the target voice module is unable to process the first control instruction, and thus being capable of controlling the second target device according to the first control instruction.

For example, after the user outputs the first voice information 'Play music', the awaken target voice module sends the first voice information to the Xiao ai server 215, the Xiao ai server converts the first voice information into a first control instruction, and forwards the first control instruction to the IOT server 212, which forwards the first control instruction to the target voice module 220 via an OT channel, and the target speech module controls itself or a player to play music according to the first control instruction.

Specifically, the third preset voice information may be a voice related to voice interaction, such as a voice in which the user needs to interact with the second target device. In response to determining the first voice information is the third preset voice information, it is indicated that the user wants to interact with the second target device. In such a case, the target voice module, after receiving the second control instruction output by the first server, determines that the target voice module is unable to process the second control instruction, thus responding directly to the first voice information emitted from the sound source according to the second control instruction to interact with the user in speech.

In the above process, since the target voice module is equipped with the voice acquisition apparatus and the audio playing apparatus, the target voice module may acquire voice and play audio to perform the audio playing function and the voice interaction function of the second target device; the processor is directly connected with the device, so the processor can directly control the second target device to perform the non-audio playing function.

After the processor has successfully executed the first control instruction, the processor returns feedback information of the successful execution of the first control instruction to the target voice module, which in turn returns it to the second server, so that the second server determines that the processor has satisfied the functions required by the user; similarly, after the target voice module successfully executes the second control instruction, the target voice module may also return feedback information of the successful execution of the second control instruction to the second server or the first server so that the first server or the second server determines that the target voice module satisfies the functions required by the user.

As shown in FIG. 2A, the first server (Xiao ai server 215 in FIG. 2A), the second server (IOT server 212 in FIG. 2A), the third server (co-server 214 in FIG. 2A), and the fourth server (mico server in FIG. 2A), each may be communicatively connected to an application 210 on which the user may implement an initialized distribution to enable the first target device connected to each server to be in a networked state.

In addition, the user may also directly issue control instructions using the application to control the second target device, and no elaboration will be made here.

With adoption of the device control method provided by the present disclosure, the user may send the first voice information output by the user to the first server and the second server in response to determining the target voice module is awakened, and returns the first control instruction corresponding to the first voice information to the target voice module of the first target device or the processor through the first server and the second server, so that the target voice module in the first target device or the processor controls the second target device according to the first control instruction.

In the process, if the user does not carry the terminal, the user only needs to communicate with the target voice module of the first target device capable of being in conversation with the user to control the second target device, and does not need to walk to the location of the second target device to control the second target device, or walk to the location of the terminal to control the second target device using the terminal, and therefore, convenience is brought to the user for controlling the second target device.

In addition, in the related art, the device master includes a WIFI module and a processor, and the WIFI module receives control instructions from the server and forwards the control instructions to the processor, and the processor controls the second target device. Since the WIFI module has no audio processing function, control of the second target device can only be implemented by the processor, when the audio function of the second target device needs to be controlled, a type of processor needs to be configured to control the second target device, and when a non-audio function of the second target device needs to be controlled, another type of processor needs to be configured to control the second target device, i.e., the second target device with different functions needs to be controlled by different device masters, resulting in less versatility of the device master.

In the present disclosure, the target voice module, compared to the WIFI module, has audio processing capability, the target voice module is to process the first control instruction which can be processed by the target voice module, in order to implement functions related to audio control such as audio play and pause, the target voice module may also forward the first control instruction that cannot be processed by itself to the processor, through the processor, functions irrelevant to audio control such as direct control of the second target device, turning on of the television, brightness control of a screen, timing function, and the like are realized. Therefore, the target audio module provided by the present disclosure has audio processing capability and the processor has non-audio processing capability, which in combination can control different second target devices with greater versatility.

Figure 2B:
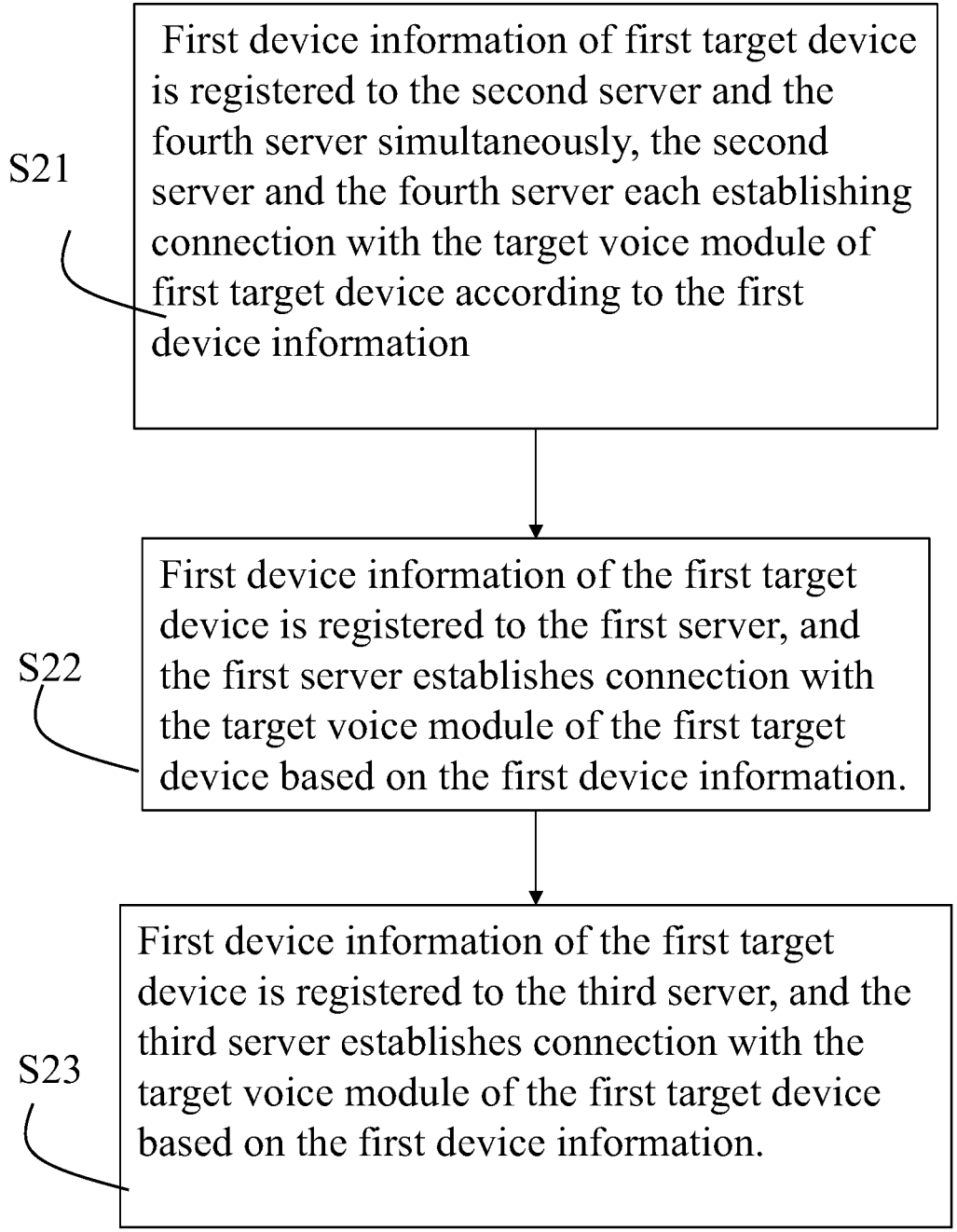
FIG. 2B is a flowchart of a device control method according to an example.

In a possible implementation, before the target voice module of the first target device communicates with each server, establishing communication connections between the target voice module of the first target device and each server is required to enable data transmission between the target voice module of the first target device and each server based on the connection, specifically including the following steps as shown in FIG. 2B:

In S21, first device information of first target device is registered to the second server and the fourth server simultaneously, the second server and the fourth server each establishing connection with the target voice module of first target device according to the first device information.

In the present disclosure, the second server is an IOT server and the fourth server is a Micro-controller based Internet Connectivity Operating system (mico) server 213.

The first device information includes identification, registration information and type of the device, etc., which is configured to uniquely identify one device.

When the different servers establish a connection with the target voice module of the first target device, the target voice module is required to upload the first device information in different formats to be parsed by the different servers.

For example, when the target voice module registers the first device information to the second server, the first device information needs to be uploaded to the second server in a model format or a Project Initiation Document (PID) format; the second server parses the first device information based on the first device information of the model format or the PID format and determines the first target device based on the first device information to establish a connection with the target voice module of the first target device.

For example, when the target voice module registers the first device information to the fourth server, the first device information needs to be uploaded to the fourth server in a hardware format; the fourth server parses the first device information of the hardware format and determines the first target device based on the first device information to establish a connection with the target voice module of the first target device.

After the target voice module of the first target device establishes a connection with the second server, the transmission of the first control instruction or the transmission of the upgrade file may be implemented via an OT channel between the two.

Specifically, as shown in FIG. 2A, the second server is communicatively coupled to the application, the application may be a Mijia app installed within the terminal, the application checks the version information and, when a version update is determined, issues the version information to the target voice module by the second server, and the target voice module obtains the upgraded file required for the upgrade from the second server, upgrades itself, or transmits the upgraded file to the processor to upgrade the processor.

After the target voice module of the first target device establishes a connection with the fourth server, Over-the-Air Technology (OTA) may be implemented, or a configuration file may be downloaded from the fourth server to update an awakening function of the target voice module in the first target device; or logs may also be uploaded to the fourth server.

Specifically, after awakening the target voice module of the first target device for a plurality of times by the co-server, there may still be instances of failure to awaken the target voice module, at which point a log of awakening failure may be uploaded to the fourth server; and a developer develops a configuration profile on the fourth server and issues the configuration profile to the target voice module to update the awakening function of the target voice module to ensure that the target voice module can be woken up normally.

In S22, first device information of the first target device is registered to the first server, and the first server establishes connection with the target voice module of the first target device based on the first device information.

In the present disclosure, the first server may be a Xiao ai server, and the first device information may be registered to the first server to establish a connection with the first server after successful registration to the fourth server and the second server.

When the first target voice module registers the first device information to the first server, the first device information needs to be registered to the first server in an Appid format, then the first server can parse the first device information of the Appid format and determines the first target device based on the first device information to establish a connection with the target voice module of the first target device.

Specifically, the target voice module establishes a cloud channel of voice interaction between the target voice module and the first server by transmitting the first device information to the first server through the Xiao ai Software Development Kit (SDK), to upload voice of the target voice module to the first server, or download voice resources from the first server, etc.

In S23, the first device information of the first target device is registered to the third server, and the third server establishes connection with the target voice module of the first target device based on the first device information.

In the present disclosure, the third server may be a co-server, and the first device information may be registered to the third server to establish a connection with the third server after successful registration to the first server.

When the first target device registers the first device information to the third server, the first device information needs to be registered to the third server in a hardware format, then the third server can parse the first device information of the hardware format and determines the first target device based on the first device information to establish a connection with the target voice module of the first target device.

Specifically, the target voice module establishes a connection with the co-server by registering the first device information to the third server through a collaboration sdk, enabling awakening control over the target voice module by the co-server.

Through the device control method provided by the present disclosure, a user can send the first voice information output by the user to the first server and the second server in response to determining the target voice module is awakened, and returns the first control instruction corresponding to the first voice information to the target voice module of the first target device through the first server and the second server, so that the target voice module in the first target device or the processor controls the second target device according to the first control instruction; that is, the target voice module has both Internet of Things (IOT) control capability and voice interaction capability, so that the first target device connected with the target voice module can be used as a control inlet of the smart home device, and voice control over the second target device is realized.

In the process, if the user does not carry the terminal, the user only needs to communicate with the first target device capable of being in conversation with the user to control the second target device, and does not need to walk to the location of the second target device to control the second target device, or walk to the location of the terminal to control the second target device using the terminal, and therefore, convenience is brought to the user for controlling the second target device.

In addition, a WIFI module in the related art has IOT control capability, but is not capable of performing voice interaction; whereas the target voice module of the present disclosure, in addition to possessing the IOT control capability, further is capable of performing voice interaction, enabling smart devices connected thereto to be a control center of the smart home device, voice control over other home devices is done, and the target voice module, without each smart device being individually configured, can possess the above mentioned capability as long as the smart devices access the target voice module, voice control over other devices can be realized, and certain versatility is achieved.

Figure 3:
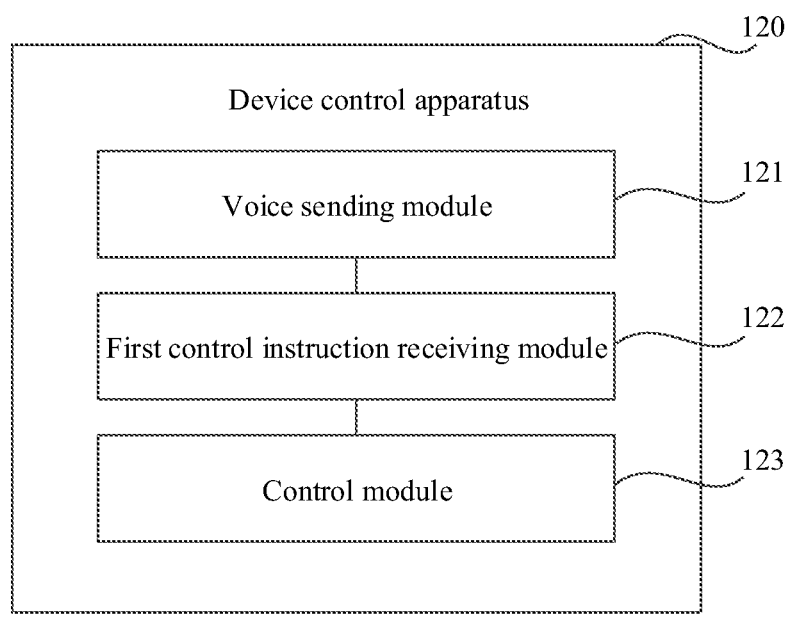
FIG. 3 is a block diagram of a device control apparatus according to an example.

FIG. 3 is a block diagram of a device control apparatus according to an example. Referring to FIG. 3, the device control apparatus 120 includes a voice sending module 121, a first control instruction receiving module 122 and a control module 123.

The voice sending module 121 is configured to, in response to determining the target voice module is awakened, send collected first voice information to a first server, the first voice information is configured to convert the first voice information into a first control instruction by the first server and send the first control instruction to a second server, and the first voice information contains information for controlling a second target device.

a first control instruction receiving module 122, configured to receive the first control instruction fed back by the second server; and a control module 123, configured to control the second target device by using the target voice module or a processor according to the first control instruction, and the target voice module and the processor are equipped in a first target device.

Optionally, the device control apparatus 120 includes:
a second voice information receiving module, configured to receive a second voice information sent by the third target device through a third server; and
an awakening module, configured to awaken the target voice module from a plurality of voice modules according to the priorities of the plurality of voice modules and the distances between the plurality of voice modules and a sound source outputting the second voice information though the third server.

Optionally, the control module 123 includes:
a first control module, configured to, in response to determining the first voice information is a first preset voice information, send the first control instruction to the processor, where the first control instruction is configured to instruct the processor to control the second target device according to the first control instruction.

Optionally, the control module 123 includes:
a second control module, configured to, in response to determining the first voice information is a second preset voice information, control the second target device according to the fires control instruction.

Optionally, the device control apparatus 120 includes:
a second control instruction receiving module, configured to, in response to determining the first voice information is a third preset voice information, receive the second control instruction fed back by the first server; and
a third control module, configured to control the second target device according to the second control instruction.

Optionally, the device control apparatus 120 includes:
an update module, configured to, in response to determining the first target device establishes a connection with the fourth server, receive a configuration file sent by the fourth server, the configuration file being configured to update an awakening function of the target voice module.

Optionally, the device control apparatus 120 includes:

a registration module, configured to register first device information of the first target device to the second server and fourth server simultaneously, the second server and the fourth server each establishing connection with target voice module of the first target device based on the first device information.

Optionally, the device control apparatus 120 includes:

an upgrade file receiving module, configured to receive an upgrade file transmitted by the second server; and an upgrade module, configured to upgrade the target voice module and the processor according to the upgraded file.

With regard to the apparatus in the above examples, the specific manners in which various modules perform operations have been described in detail in the examples relating to the methods, and details are not described herein.

The disclosure further provides a computer-readable storage medium, having stored thereon computer program instructions and the steps of the device control method provided by the present disclosure are implemented when the program instructions are executed by the processor.

Figure 4:
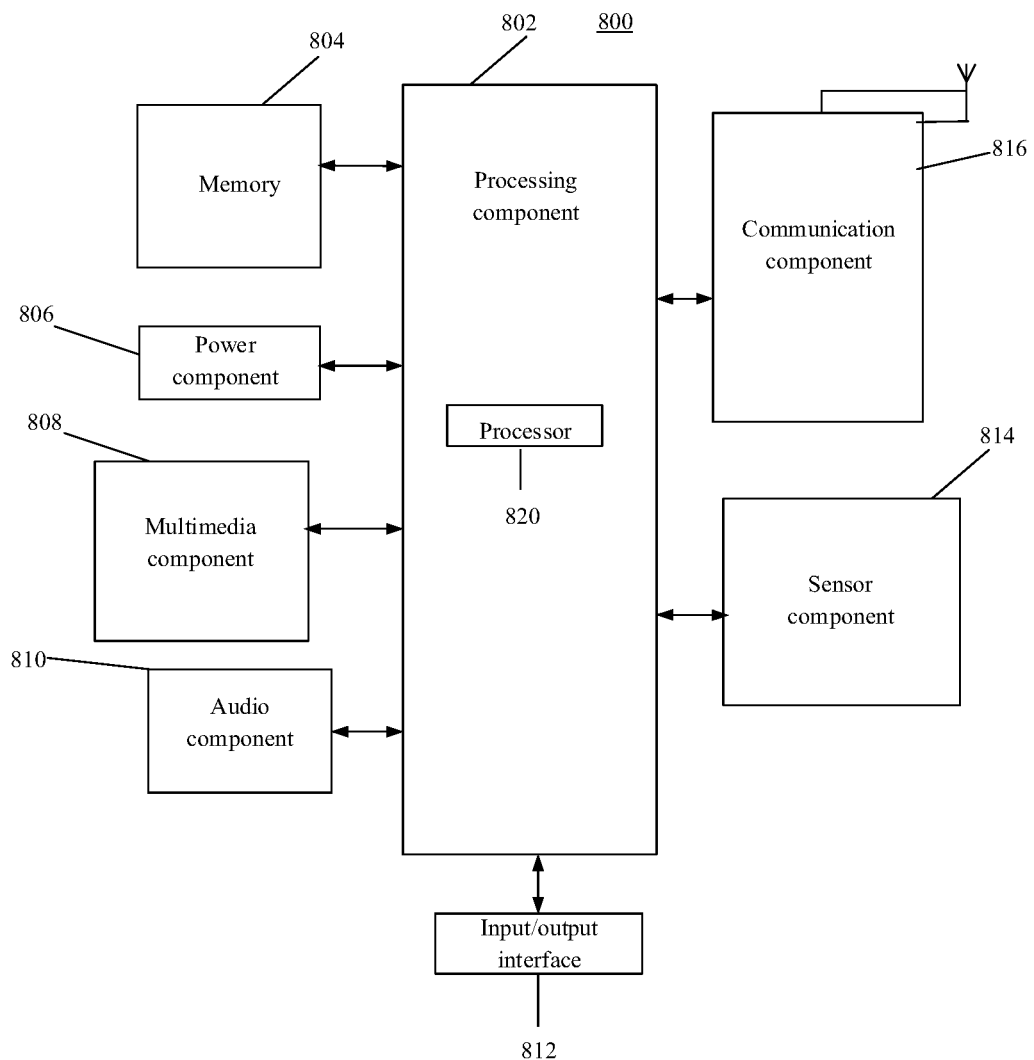
FIG. 4 is a block diagram of an apparatus according to an example.

FIG. 4 is a block diagram of a device control apparatus 800 according to an example. For example, the apparatus 800 may be a mobile phone, a computer, a digital broadcasting terminal, a messaging device, a game console, a tablet device, a medical device, a fitness device, a personal digital assistant, etc.

Referring to FIG. 4, the apparatus 800 may include one or more of the following components: a processing component 802, a memory 804, a power component 806, a multimedia component 808, an audio component 810, an input/output interface 812, a sensor component 814, and a communication component 816.

The processing component 802 usually controls the overall operations of the apparatus 800, such as operations associated with display, telephone call, data communication, camera operation and recording operation. The processing component 802 may include one or more processors 820 to execute instructions to complete all of or part of the steps of the above method. In addition, the processing component 802 may include one or more modules to facilitate the interaction between the processing component 802 and other components. For example, the processing component 802 may include a multimedia module to facilitate interaction between the multimedia component 808 and the processing component 802.

The memory 804 is configured to store various types of data to support operations at the apparatus 800. Examples of these data include instructions for any application or method operated on the apparatus 800, contact data, phone book data, messages, pictures, videos, etc. The memory 804 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 provides power for various components of the apparatus 800. The power component 806 may include a power management system, one or more power sources, and other components associated with power generation, management and distribution of the apparatus 800.

The multimedia component 808 includes a screen for providing an output interface between the apparatus 800 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some embodiments, the multimedia component 808 includes a front camera and/or a rear camera. When the apparatus 800 is in an operation mode, such as a shooting mode or a video mode, the front camera and/or the rear camera can receive external multimedia data. Each front or rear camera may be a fixed optical lens system or have focal length and optical zoom capability.

The audio assembly 810 is configured to output and/or input audio signals. For example, the audio component 810 includes a microphone (MIC), and when the apparatus 800 is in an operation mode, such as a call mode, a recording mode, and a voice recognition mode, the microphone is configured to receive external audio signals. The received audio signals may be further stored in the memory 804 or sent by the communication component 816. In some examples, the audio assembly 810 further includes a speaker for outputting audio signals.

The input/output interface 812 provides an interface between the processing component 802 and a peripheral interface module. The peripheral interface module may be a keyboard, a click wheel, buttons, etc. These buttons may include, but are not limited to a home button, a volume button, a start button, and a lock button.

The sensor component 814 includes one or more sensors for providing various aspects of status assessment for the apparatus 800. For example, the sensor component 814 may detect the on/off state of the apparatus 800, and relative positions of components such as a display and a keypad of the apparatus 800. The sensor component 814 may further detect a position change of the apparatus 800 or one component of the apparatus 800, presence or absence of contact between the user and the apparatus 800, an orientation or acceleration/deceleration of the apparatus 800 and a temperature change of the apparatus 800. The sensor component 814 may include a proximity sensor configured to detect the presence of nearby objects without any physical contact. The sensor component 814 may also include an optical sensor, such as a CMOS or CCD image sensor, for use in imaging applications. In some embodiments, the sensor component 814 may further include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 may access a wireless network based on communication standards, such as WiFi, 2G or 3G, or a combination thereof. In an example, the communication component 816 receives broadcast signals or broadcast associated information from an external broadcast management system via a broadcast channel. In an example, the communication component 816 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements to perform the above device control method.

In an example, a non-transitory computer-readable storage medium including instructions is further provided, such as a memory 804 including instructions executable by the processor 820 of the apparatus 800 to complete the above device control method. For example, the non-transitory computer-readable storage medium may be an ROM, a random access memory (RAM), a CD-ROM, a magnetic tape, a floppy disk, an optical data storage device, etc.

The apparatus described above may be a separate electronic device, or may be part of a separate electronic device, for example in an embodiment, the apparatus may be an Integrated Circuit (IC) or a chip, the integrated circuit may be an IC or a collection of ICs; the chip may include, but is not limited to, the following: a Graphics Processing Unit (GPU), a Central Processing Unit (CPU), a Programmable Gate Array (FPGA), a Digital Signal Processor (DSP), an Application Specific Integrated Circuit (ASIC), a System on Chip (SOC), etc. The integrated circuit or chip described above may be used to execute executable instructions (or codes) to implement the device control method described above. The executable instructions may be stored on the integrated circuit or chip, or obtained from other apparatuses or devices, such as the integrated circuit or chip including a processor, a memory, and an interface for communicating with other apparatuses. The executable instructions may be stored in the memory that, when executed by the processor, implement the device control method described above; or, the integrated circuit or chip may receive executable instructions via the interface and transmit the executable instructions to the processor for execution to implement the device control method described above.

In another example, a computer program product is further provided, which includes a computer program capable of being executed by a programmable apparatus, and the computer program is provided with a code part for executing the above device control method when the computer program is executed by the programmable apparatus.

It would be easy for those skilled in the art to conceive of another example of the present disclosure upon consideration of the specification and practice of the present disclosure. This application is intended to cover any variation, use, or adaptation of the disclosure, and these variations, uses, or adaptations follow the general principles of the disclosure and include common general knowledge or customary technical means in the art that are not disclosed in the disclosure. The specification and examples are considered as exemplary only, and the true scope and spirit of the disclosure is indicated by the following claims.

It should be understood that the present disclosure is not limited to the precise structure described above and shown in the drawings, and various modifications and changes can be made without departing from its scope. The scope of the present disclosure is only limited by the appended claims.

What is claimed is:

1. A method for controlling a device that includes a target voice module, the method comprising:
   sending a first voice information to a first server in response to determining the target voice module is awakened, the first voice information is used to convert the first voice information into a first control instruction by the first server and send the first control instruction to a second server, and the first voice information contains information for controlling a second target device;
   receiving the first control instruction fed back by the second server;
   controlling the second target device by using the target voice module or a processor according to the first control instruction, and the target voice module and the processor are equipped in a first target device;
   determining whether the target voice module is capable of processing the first control instruction;
   performing, according to the first control instruction, audio function control on a target device in response to determining the target voice module is capable of processing the first control instruction; and
   performing, according to the first control instruction, non-audio function control on the target device through a processor of the first target device in response to determining the target voice module is not capable of processing the first control instruction;
   wherein the target voice module is awakened by:
      receiving, by a third server, a second voice information sent by a third target device; and
      awakening, by the third server, the target voice module from a plurality of voice modules according to priorities of the plurality of voice modules and distances between the plurality of voice modules and a sound source outputting the second voice information
   wherein the target device is the first target device in which the target voice module is located, or the target device is the second target device that supports IoT control and differs from the first target device.

2. The method according to claim 1, wherein the performing, according to the first control instruction, non-audio function control on target device through a processor of the first target device comprises:
   sending the first control instruction to the processor in response to determining the first voice information is a first preset voice information, and the first control instruction is used to instruct the processor to control the second target device according to the first control instruction;
   wherein the first preset voice information is voice information irrelevant to audio playing.

3. The method according to claim 1, wherein the performing, according to the first control instruction, the audio function control on a target device comprises:
   controlling the second target device according to the first control instruction in response to determining the first voice information is a second preset voice information;
   wherein the second preset voice information is voice information related to audio playing.

4. The method according to claim 1, further comprising:
   receiving a second control instruction fed back by the first server in response to determining the first voice information is a third preset voice information; and
   controlling the second target device according to the second control instruction;
   wherein the third preset voice information is voice information related to voice interaction.

5. The method according to claim 2, wherein the method further comprises:
   receiving a configuration file sent by a fourth server in response to determining the first target device establishes a connection with the fourth server, and the configuration file is used to update an awakening function of the target voice module.

6. The method according to claim 1, wherein the method further comprises:
registering first device information of the first target device to the second server and a fourth server simultaneously, and the second server and the fourth server establishing connection with the target voice module of the first target device according to the first device information.

7. The method according to claim 1, wherein the method further comprises:
receiving an upgrade file sent by the second server; and
upgrading the target voice module and the processor according to the upgraded file.

8. A non-transitory computer-readable storage medium storing computer program instructions for controlling a device, wherein the computer program instructions when executed by a processor cause the processor to execute a method comprising:
sending a first voice information to a first server in response to determining a target voice module is awakened, the first voice information is used to convert the first voice information into a first control instruction by the first server and send the first control instruction to a second server, and the first voice information contains information for controlling a second target device;
receiving the first control instruction fed back by the second server; and
controlling the second target device by using the target voice module or the processor according to the first control instruction, and the target voice module and the processor are equipped in a first target device;
wherein the target voice module is awakened by:
receiving, by a third server, a second voice information sent by a third target device; and
awakening, by the third server, the target voice module from a plurality of voice modules according to priorities of the plurality of voice modules and distances between the plurality of voice modules and a sound source outputting the second voice information
performing, according to the first control instruction, audio function control on a target device in response to determining the target voice module is capable of processing the first control instruction
performing, according to the first control instruction, non-audio function control on target device through a processor of the first target device in response to determining the target voice module is not capable of processing the first control instruction;
wherein the target device is the first target device in which the target voice module is located, or the target device is the second target device that supports IoT control and differs from the first target device.

9. The non-transitory computer-readable storage medium according to claim 8, wherein performing, according to the first control instruction, non-audio function control on target device through a processor of the first target device comprises:
send the first control instruction to the processor of the first target device in response to determining the first voice information is a first preset voice information, and the first control instruction is used to instruct the processor of the first target device to control the second target device according to the first control instruction;
wherein the first preset voice information is voice information irrelevant to audio playing.

10. The non-transitory computer-readable storage medium according to claim 8, wherein the performing, according to the first control instruction, the audio function control on a target device comprises:
controlling the second target device according to the first control instruction in response to determining the first voice information is a second preset voice information;
wherein the second preset voice information is voice information related to audio playing.

11. The non-transitory computer-readable storage medium according to claim 8, wherein the method further comprises
receiving a second control instruction fed back by the first server in response to determining the first voice information is a third preset voice information; and
controlling the second target device according to the second control instruction;
wherein the third preset voice information is voice information related to voice interaction.

12. The non-transitory computer-readable storage medium according to claim 9, wherein the method further comprises:
receiving a configuration file sent by a fourth server in response to determining the first target device establishes a connection with the fourth server, and the configuration file is used to update an awakening function of the target voice module.

13. The non-transitory computer-readable storage medium according to claim 8, wherein the method further comprises:
registering first device information of the first target device to the second server and a fourth server simultaneously, and the second server and the fourth server establishing connection with the target voice module of the first target device according to the first device information.

14. The non-transitory computer-readable storage medium according to claim 8, wherein the method further comprises:
receiving an upgrade file sent by the second server; and
upgrading the target voice module and the processor according to the upgraded file.

15. A chip, comprising:
a processor; and
an interface that is communicatively coupled to the processor, wherein the processor is configured to:
receive a second voice information sent by a third target device through a third server; and
awaken, by the third server, a target voice module from a plurality of voice modules according to priorities of the plurality of voice modules and distances between the plurality of voice modules and a sound source outputting the second voice information;
wherein the target voice module is awakened by:
receiving, by the third server, the second voice information sent by the third target device;
awakening, by the third server, the target voice module from the plurality of voice modules according to priorities of the plurality of voice modules and the distances between the plurality of voice modules and the sound source outputting the second voice information;
performing, according to a first control instruction, audio function control on a target device in response to determining the target voice module is capable of processing the first control instruction;
performing, according to the first control instruction, non-audio function control on target device through a processor of a first target device in response to determining the target voice module is not capable of processing the first control instruction;

wherein the target device is the first target device in which the target voice module is located, or the target device is a second target device that supports IoT control and differs from the first target device.

16. The chip according to claim 15, wherein the performing, according to the first control instruction non-audio function control on target device through a processor of the first target device comprises:

sending the first control instruction to the processor of the first target device in response to determining a first voice information is a first preset voice information, and the first control instruction is used to instruct the processor of the first target device to control the second target device according to the first control instruction;

wherein the first preset voice information is voice information irrelevant to audio playing.

17. The chip according to claim 15, wherein the performing, according to the first control instruction, the audio function control on a target device comprises:

controlling the second target device according to the first control instruction in response to determining a first voice information is a second preset voice information;

wherein the second preset voice information is voice information related to audio playing.

18. The chip according to claim 15, wherein the processor is further configured to:

receive a second control instruction fed back by a first server in response to determining the first voice information is a third preset voice information; and controlling the second target device according to the second control instruction;

wherein the third preset voice information is voice information related to voice interaction.

* * * * *